United States Patent [19]
Scherenberg et al.

[11] 3,804,433
[45] Apr. 16, 1974

[54] WHEEL SUSPENSION FOR VEHICLES

[75] Inventors: Hans O. Scherenberg, Stuttgart; Alfred Rothweiler, Esslingen-Hegensberg; Erich Waxenberger, Neuhausen, all of Germany

[73] Assignee: Daimler-Benz Aktiengesellschaft, Stuttgart, Germany

[22] Filed: Aug. 25, 1972

[21] Appl. No.: 283,669

[30] Foreign Application Priority Data
Aug. 25, 1971 Germany .......................... 2142523

[52] U.S. Cl. ........................ 280/106.5 R, 280/124 R
[51] Int. Cl. .............................................. B60g 3/14
[58] Field of Search..... 280/106.5 R, 124 A, 124 R, 280/124 F

[56] References Cited
UNITED STATES PATENTS
3,068,020  12/1962  Muller..................... 280/106.5 R
3,024,040  3/1962   Muller..................... 280/106.5 R
3,498,631  3/1970   Van Winsen................ 280/124 R

*Primary Examiner*—Philip Goodman
*Attorney, Agent, or Firm*—Craig & Antonelli

[57] ABSTRACT

A wheel suspension, particularly a front wheel suspension in motor vehicles, which utilizes triangular or similar guide members whose two guide arms are rigidly connected with each other and are elastically supported independently of one another at the vehicle superstructure; of the two guide members of a wheel suspension associated with two wheels disposed opposite one another on the two sides of the vehicle, one of the two guide arms of a guide member is elastically supported directly at the vehicle superstructure and absorbs the spring forces of the wheel spring system while the other guide arm is elastically supported at a transverse yoke which in turn is elastically connected with the vehicle superstructure.

24 Claims, 3 Drawing Figures

PATENTED APR 16 1974　　　　　　　　　　　　　　　　3,804,433

WHEEL SUSPENSION FOR VEHICLES

The present invention relates to a wheel suspension, especially to a front wheel suspension in motor vehicles with the use of a triangular or similar (for example, fork-like) guide member whose two guide arms rigidly connected with each other are elastically supported at the vehicle superstructure independently of one another.

With wheel suspensions of this type, there exists a tendency to shock-like or jerk-like vibrations or oscillations (jolting) of the vehicle. This tendency occurs especially in constructions with auxiliary frames, on which the guide members, possibly together with the vehicle driving engine, are elastically supported in common and which, as this is desirable as a rule, is supported at the vehicle superstructure by elastic bearing supports that are relatively soft in the vertical direction.

The aim of the present invention is to eliminate this jolting or jerking tendency in a simple and effective manner. The present invention essentially consists in that of the two triangular or similarly shaped guide members of the wheel suspension of the wheels disposed opposite one another on both vehicle sides, one of the two guide arms, on which are essentially supported the spring forces of the wheel spring system, is elastically supported directly at the vehicle superstructure and the other of the two guide arms is elastically supported at a transverse yoke which is independent of the remaining wheel suspension but is common to the wheel suspensions of both side and is elastically connected, in its turn, to lateral frame members of the vehicle superstructure. The term "vehicle superstructure" is used herein for the sake of simplicity to refer to the fixed structure of the vehicle, such as its frame or the self-supporting vehicle body thereof while the term "triangular guide member" will be used herein to designate guide members of triangular or analogous shape as known in the art.

Advantageously, the transverse yoke is elastically connected at its two ends by means of rubber bushings or sleeves having axes extending essentially in the vehicle longitudinal direction with the vehicle superstructure, for example, with one frame longitudinal bearer each and preferably each outside of the elastic bearing support of the guide arms.

It has been discovered that by the use of a wheel suspension of the type in accordance with the present invention, the tendency of the vehicle to the aforementioned jolting vibrations or oscillations as well as also the tendency for noise transmissions can be effectively reduced or prevented in a relatively simple manner as a result of the double insulation by elastic elements interposed between the guide arm and the vehicle superstructure. Exclusively the elastic bearing support connecting the guide arm with the transverse yoke is stressed in torsion by the spring movement of the wheel whereas the elastic bearing support connecting the transverse yoke with the vehicle superstructure is relieved therefrom and serves exclusively the vibration damping and noise insulation. Any interfering or disturbing force occurring at the transverse yoke is uniformly absorbed on both sides by the yoke-bearing supports connecting the cross member with the remaining vehicle superstructure.

By reason of the fact that the wheel spring system and shock absorber device are supported on the guide arm directly elastically supported at the vehicle superstructure, especially on the forward guide arm, the other guide arm, especially the rear guide arm which is elastically supported doubly at the vehicle superstructure receives no static load. With a large base of the bearing supports, the forces transmitted onto the same can be kept relatively small so that the bearing supports can be constructed soft and an effective absorption of the vibrations or oscillations stemming from the road surface is attainable.

Accordingly, it is an object of the present invention to provide a wheel suspension, especially a front wheel suspension in motor vehicles which avoids by simple means the aforementioned shortcomings and drawbacks encountered in the prior art.

Another object of the present invention resides in a wheel suspension for vehicles, especially a front wheel suspension for motor vehicles which substantially eliminates the tendency for jolt-like vibrations and oscillations on the part of the vehicle.

A further object of the present invention resides in a wheel suspension of the type which permits an effective reduction or elimination of the transmission of noises by simple means.

Still another object of the present invention resides in a wheel suspension of the type described above which permits the use of relatively soft bearing supports, thus enabling an effective absorption of vibrations and oscillations stemming from the road.

These and other objects, features and advantages of the present invention will become more apparent from the following description when taken in connection with the accompanying drawing which shows, for purposes of illustration only, two embodiments in accordance with the present invention, and wherein.

Figure 1:
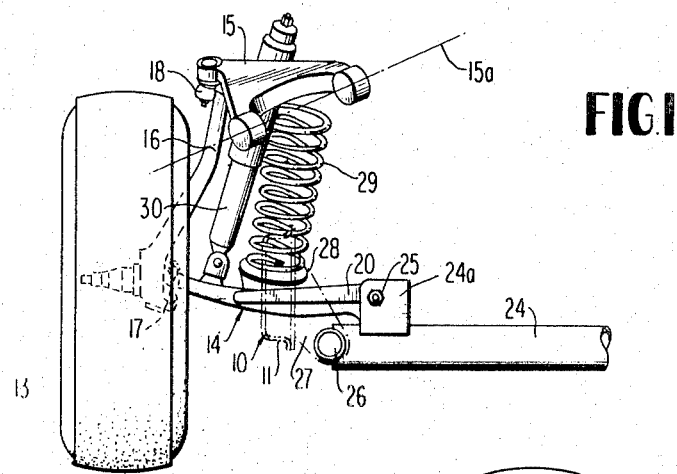
FIG. 1 is a rear elevational view of a wheel suspension in accordance with the present invention.

Referring now to the drawing wherein like reference numerals are used throughout the various views to designate like parts, reference numeral 10 generally designates a vehicle superstructure which includes a frame consisting, for example, of longitudinal bearers 11 and cross bearers 12, of which one cross bearer 12--constructed, for example, as tubular bearer--is illustrated in the drawing. The wheel 13 as well as a corresponding oppositely disposed wheel (not shown) is suspended at the vehicle superstructure 10 by means of a wheel guide suspension system. The guide system includes, for example, a lower triangular guide member generally designated by reference numeral 14 and an upper guide member 15 actuating, for example, a stabilizer (not shown) and elastically supported directly at the vehicle superstructure 10, for example, pivotally supported at the vehicle superstructure 10 about an axis 15a (FIG. 1). A wheel carrier 16 carrying the wheel 13 is pivotally interconnected as coupling member between the lower guide member 14 and the upper guide member 15. For example, the wheel carrier 16 is connected with the lower guide member 14 by a joint 17 of conventional construction and with the upper guide member 15 by a joint 18 also of conventional construction.

In lieu of a guide system with a second guide member 15, also another guide system may be provided, for example, a guide system in which the second guide member is replaced by a telescopic guide means or the like supporting the wheel carrier against the vehicle superstructure in the upward direction.

Figure 2:
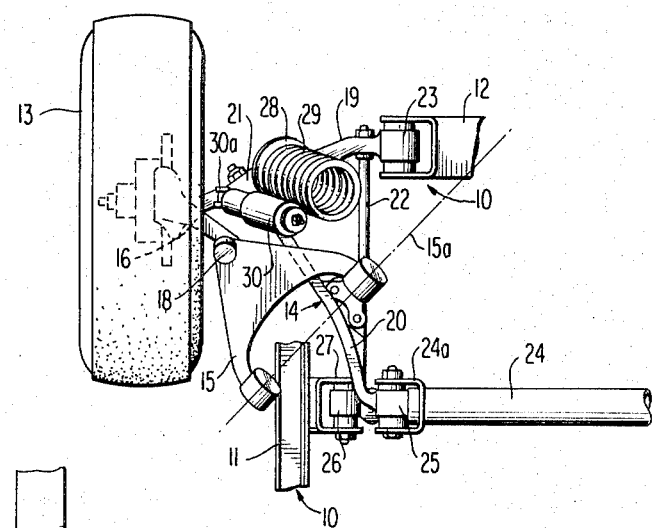
FIG. 2 is a top plan view on the wheel suspension according to FIG. 1.
Figure 3:
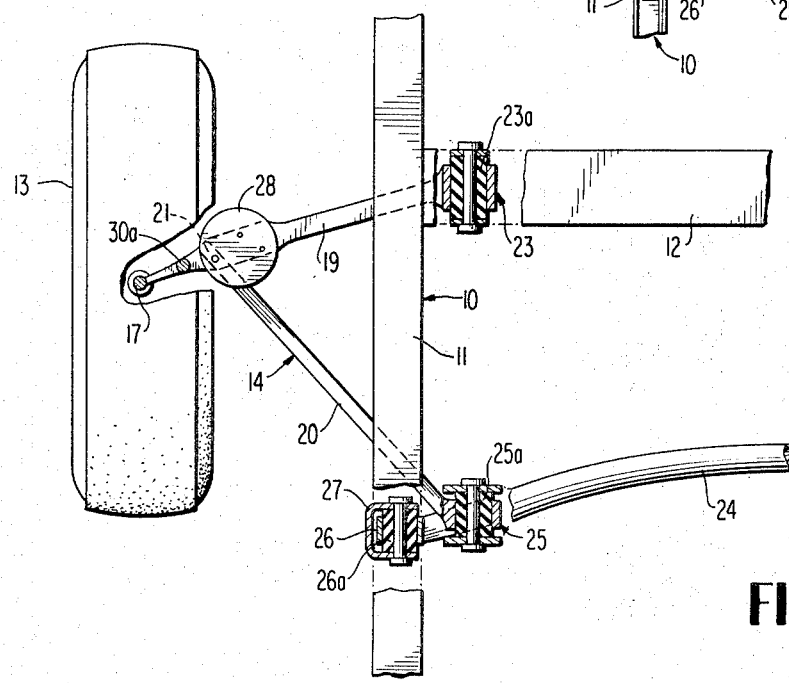
FIG. 3 is a schematic view of a lower guide member of an embodiment of a wheel suspension in accordance with the present invention which is somewhat modified from that of FIG. 2, omitting the upper wheel guide parts and partially in cross section through the elastic bearing supports thereof.

The triangular guide member 14 (FIGS. 1, 2 and 3) consists of a forward guide arm 19 and of a rear guide arm 20 which are rigidly connected with each other at 21, in particular are welded to one another and may be reinforced with respect to one another, for instance, by a longitudinal brace or strut 22 (FIG. 2). The forward guide arm 19 is arranged essentially transversely to the driving direction and is supported directly at the vehicle superstructure 10, for example, at the cross bearer 12 in a guide bearing support 23 having an axis extending approximately in the vehicle longitudinal direction by interposition of a rubber sleeve 23a (FIG. 3).

The rear guide arm 20 which is directed obliquely toward the rear is elastically supported at a bearing lug or bracket 24a (FIGS. 1 and 2) of a transverse yoke 24 coordinated in common to the guide members 14 of both sides of the vehicle, within a bearing support 25---also under interposition of a rubber sleeve 25a (FIG. 3) having an axis extending approximately in the vehicle longitudinal direction. The cross yoke 24, in its turn, is supported at both ends thereof constructed in a sleeve-shaped manner in a bearing lug or bracket 27 also under interposition of a rubber sleeve 26a each--preferably with great yieldingness in the vehicle transverse direction--having an axis extending approximately in the vehicle longitudinal direction; the bearing lug or bracket 27 is rigidly connected with the vehicle superstructure, for example, is welded to the longitudinal bearers 11.

Owing to the rubber sleeves 25a and 26a, the guide arm 20 is elastically connected with the vehicle structure 10 under interposition of two elastic yieldingnesses.

If eccentrics or the like are arranged in the bearing joints 23 and 25 for the purpose of camber and caster readjustments, then stresses as a result of undertaken changes of camber or caster occur only in the rubber bushings 25a whereas the rubber bearings 26a at the ends of the transverse yoke 24 are relieved therefrom.

Springs 29, for example, coil springs, serve for the spring support of the wheels with respect to the vehicle superstructure; the springs 29 are supported by means of spring plates 28 at the forward guide arm 19 whereas the shock absorber device 30 is also supported at the forward guide arm 19 at 30a. The support takes place thereby preferably on the center line connecting with each other the two joints of the guide arm 19. As a result thereof, the rear guide arm 20 is relieved of forces acting between wheel and vehicle body.

The wheels 13 can be constructed as steerable or non-steerable wheels, and as driven or non-driven wheels of the vehicle.

While we have shown and described two embodiments in accordance with the present invention, it is understood thaat the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A wheel suspension for a vehicle with a wheel spring means and a superstructure, comprising guide means disposed on mutually opposite sides of the vehicle, said guide means constituting a portion of the wheel suspension for a respective side of the vehicle, each of said guide means including guide arm means rigidly connected with one another, means for elastically supporting said guide arm means independently of one another at the vehicle superstructure, a transverse yoke means independent of the remaining wheel suspension interconnecting the wheel suspensions on both vehicle sides, means for elastically connecting said transverse yoke means with the vehicle superstructure, one of said guide arm means provided on a respective side of the vehicle essentially supporting the spring forces of the wheel spring means and being elastically supported directly at the vehicle superstructure, the other of said guide arm means being elastically supported at said transverse yoke means.

2. A wheel suspension according to claim 1, wherein the vehicle superstructure includes lateral frame members, said transverse yoke means being elastically connected with said lateral frame members.

3. A wheel suspension according to claim 1, wherein the wheel suspension utilizes triangular guide means each having two guide arm means.

4. A wheel suspension according to claim 1, wherein the wheel suspension is a front wheel suspension of a motor vehicle.

5. A wheel suspension according to claim 1, wherein rubber sleeve means are provided for elastically connecting said transverse yoke means with the vehicle superstructure at both ends thereof.

6. A wheel suspension for a vehicle with a wheel spring means and a superstructure, comprising: guide means disposed on mutually opposite sides of the vehicle, said guide means constituting a portion of the wheel suspension for a respective side of the vehicle, each of said guide means including guide arm means rigidly connected with one another, means for elastically supporting said guide arm means independently of one another at the vehicle superstructure, a transverse yoke means independent of the remaining wheel suspension interconnecting the wheel suspensions on both vehicle sides, rubber sleeve means for elastically connecting said transverse yoke means with the vehicle superstructure at both ends thereof, said rubber sleeve means have axes extending essentially in the vehicle longitudinal direction, one of said guide arm means provided on a respective side of the vehicle essentially supporting the spring forces of the wheel spring means and being elastically supported directly at the vehicle superstructure, the other of said guide arm means being elastically supported at said transverse yoke means.

7. A wheel suspension according to claim 6, wherein elastic bearing supports are provided for said guide arm means and said transverse yoke means is elastically connected with the vehicle superstructure outside of said elastic bearing supports.

8. A wheel suspension according to claim 6, including a shock absorber means, wherein said guide arm means directly supported at the vehicle superstructure is a forward guide arm means, as viewed in the driving direction, said forward guide arm means extending primarily in the vehicle transverse direction and supporting the wheel spring means and the shock absorber means, the other guide arm means is a rear guide arm means supported on said common transverse yoke means, said rear guide arm means being directed obliquely rearwardly with a large distance of its bearing support relative to that of the forward guide arm means.

9. A wheel suspension according to claim 8, including a shock absorber means, wherein the wheel spring means and the shock absorber means are supported at least nearly along the center line of said forward guide arm means.

10. A wheel suspension according to claim 8, including a shock absorber means, wherein the wheel spring means and shock absorber means are supported essentially on the center line of the forward guide arm means.

11. A wheel suspension for a vehicle with a wheel spring means, a shock absorber means, and a superstructure, comprising: guide means disposed on mutually opposite sides of the vehicle, said guide means constituting a portion of the wheel suspension for a respective side of the vehicle, each of said guide means including guide arm means rigidly connected with one another, means for elastically supporting said guide arm means independently of one another at the vehicle superstructure, a transverse yoke means independent of the remaining wheel suspension interconnecting the wheel suspensions on both vehicle sides, elastic bearing support means for connecting said transverse yoke means with the vehicle superstructure, said elastic bearing support means including elastic sleeve means, one of said guide arm means provided on a respective side of the vehicle essentially supporting the spring forces of the wheel spring means and being elastically supported directly at the vehicle superstructure, the other of said guide arm means being elastically supported at said transverse yoke means, said guide arm means directly supported at the vehicle superstructure being a forward guide arm means, as viewed in the driving direction, said forward guide arm means extending primarily in the vehicle transverse direction and supporting the wheel spring means and the shock absorber means, the other guide arm means being a rear guide arm means supported on said common transverse yoke means, said rear guide arm means being directed obliquely rearwardly with a large distance of its bearing support relative to that of the forward guide arm means, and the wheel spring means and the shock absorber means being supported at least nearly along the center line of said forward guide arm means.

12. A wheel suspension according to claim 11, wherein said last-mentioned elastic sleeve means are relatively soft in the vehicle transverse direction.

13. A wheel suspension according to claim 12, wherein said last-mentioned elastic sleeve means each have an axis extending essentially in the vehicle longitudinal direction.

14. A wheel suspension according to claim 13, wherein the wheel suspension utilizes triangular guide means each having two guide arm means.

15. A wheel suspension according to claim 14, wherein the vehicle superstructure includes lateral frame members, said transverse yoke means being elastically connected with said lateral frame members.

16. A wheel suspension according to claim 15, wherein the wheel suspension is a front wheel suspension of a motor vehicle.

17. A wheel suspension according to claim 1, wherein elastic bearing supports are provided for said guide arm means and said transverse yoke means is elastically connected with the vehicle superstructure outside of said elastic bearing supports.

18. A wheel suspension for a vehicle with a wheel spring means, a shock absorber means, and a superstructure, comprising: guide means disposed on mutually opposite sides of the vehicle, said guide means constituting a portion of the wheel suspension for a respective side of the vehicle, each of said guide means including guide arm means rigidly connected with one another, means for elastically supporting said guide arm means independently of one another at the vehicle superstructure, a transverse yoke means independent of the remaining wheel suspension interconnecting the wheel suspensions on both vehicle sides, means for elastically connecting said transverse yoke means with the vehicle superstructure, one of said guide arm means provided on a respective side of the vehicle essentially supporting the spring forces of the wheel spring means and being elastically supported directly at the vehicle superstructure, the other of said guide arm means being elastically supported at said transverse yoke means, said guide arm means directly supported at the vehicle superstructure is a forward guide arm means, as viewed in the driving direction, said forward guide arm means extending primarily in the vehicle transverse direction and supporting the wheel spring means and the shock absorber means, the other guide arm means is a rear guide arm means supported on said common transverse yoke means, said rear guide arm means being directed obliquely rearwardly with a large distance of its bearing support relative to that of the forward guide arm means.

19. A wheel suspension according to claim 18, wherein the wheel spring means and shock absorber means are supported at least nearly along the center line of the forward guide arm means.

20. A wheel suspension according to claim 18, wherein the wheel spring means and shock absorber means are supported essentially on the center line of the forward guide arm means.

21. A wheel suspension according to claim 1, wherein an elastic bearing support means is provided for connecting said transverse yoke means with the vehicle superstructure, said elastic bearing support means including elastic sleeve means.

22. A wheel suspension for a vehicle with a wheel spring means and a superstructure, comprising: guide means disposed on mutually opposite sides of the vehicle, said guide means constituting a portion of the wheel suspension for a respective side of the vehicle, each of said guide means including guide arm means rigidly connected with one another, means for elastically supporting said guide arm means independently of one another at the vehicle superstructure, a transverse yoke means independent of the remaining wheel suspension interconnecting the wheel suspensions on both vehicle sides, elastic bearing support means for connecting said transverse yoke means with the vehicle superstructure, said elastic bearing support means including elastic sleeve means, said elastic sleeve means being relatively soft in the vehicle transverse direction, one of said guide arm means provided on a respective side of the vehicle essentially supporting the spring forces of the wheel spring means and being elastically supported directly at the vehicle superstructure, the other of said guide arm means being elastically supported at said transverse yoke means.

23. A wheel suspension according to claim 21, wherein said last-mentioned elastic sleeve means each have an axis extending essentially in the vehicle longitudinal direction.

24. A wheel suspension according to claim 23, wherein said last-mentioned elastic sleeve means are relatively soft in the vehicle transverse direction.

* * * * *